United States Patent [19]

Huggins et al.

[11] Patent Number: 4,866,698

[45] Date of Patent: Sep. 12, 1989

[54] MULTIPLEXED OPTICAL COMMUNICATION SYSTEM

[75] Inventors: Raymond W. Huggins, Mercer Island; Robert A. Falk, Renton, both of Wash.

[73] Assignee: The Boeing Company, Seattle, Wash.

[21] Appl. No.: 121,474

[22] Filed: Nov. 17, 1987

[51] Int. Cl.$^4$ .............................................. H04B 9/00
[52] U.S. Cl. ...................................... 370/1; 455/600; 455/612; 455/617; 350/96.14
[58] Field of Search ............... 370/1, 2; 455/600, 611, 455/612, 617, 620; 350/96.14, 96.13, 96.12; 356/345

[56] References Cited

U.S. PATENT DOCUMENTS

| | | | |
|---|---|---|---|
| 4,236,243 | 11/1980 | Davies et al. | 370/3 |
| 4,340,272 | 7/1982 | Papuchon et al. | 350/96.14 |
| 4,502,037 | 2/1985 | Le Parquier et al. | 350/96.14 |
| 4,505,587 | 3/1985 | Haus et al. | 350/96.14 |
| 4,505,588 | 3/1985 | Ludman et al. | 350/96.14 |
| 4,533,247 | 8/1985 | Epworth | 356/345 |
| 4,581,730 | 4/1986 | Ozeki et al. | 370/2 |
| 4,583,817 | 4/1986 | Papuchon | 350/96.14 |
| 4,592,043 | 5/1986 | Williams | 370/3 |
| 4,699,513 | 10/1987 | Brooks et al. | 356/345 |
| 4,763,973 | 8/1988 | Inoue et al. | 350/96.14 |

FOREIGN PATENT DOCUMENTS 0107324  6/1984  Japan ................................. 350/96.13

OTHER PUBLICATIONS

J. L. Brooks et al., "Coherence Multiplexing of Fiber-Optic Interferometric Sensors," *Journal of Lightwave Technology*, vol. LT-3, No. 5, Oct. 1985, pp. 1062–1072.
A. Dandridge et al., "Phase Noise of Single-Mode Diode Lasers in Interferometer Systems," *Appl. Phys. Lett.*, 39(7), Oct. 1, 1981, pp. 530–532.
K. Peterman et al., "Semiconductor Laser Noise in an Interferometer System," *IEEE Journal of Quantum Electronics*, vol. QE-17, No. 7, Jul. 1981, pp. 1251–1256.
C. S. Wang et al., "High-Power Low-Divergence Superradiance Diode," *Appl. Phys. Lett.*, 41(7), Oct. 1, 1982, pp. 587–589.
R. H. Wentworth et al., "Expected Noise Levels for Interferometric Sensors Multiplexed Using Partially Coherent Light," Proceedings of Society of Photo-Optical Instrumentation Engineers, vol. 566, Fiber Optic and Laser Sensors III, (1985), pp. 212–217.

*Primary Examiner*—Robert L. Griffin
*Assistant Examiner*—Andrew J. Telesz, Jr.
*Attorney, Agent, or Firm*—Christensen, O'Connor, Johnson & Kindness

[57] ABSTRACT

A multiplexed optical communication system comprising a source (12), a common optical bus (18, 20), a multiplexer (14) and a demultiplexer (16). The multiplexer comprises a plurality of modulators (50), each being formed in an electro-optic substrate and comprising a modulated arm (54) and a reference arm (56). Each arm comprises an optical waveguide, and the arms of each modulator have an optical path length difference LM(i) that is greater than the coherence length of the source, and that differs from the path length difference of each other modulator by an amount greater than the coherence length of the source. Each modulator also includes electrodes for varying the optical path length of its modulated arm based upon an electrical input signal representing an input data channel. The demultiplexer comprises a plurality of detectors, each having first and second detector arms, each detector arm comprising an optical waveguide. The detector arms have an optical path length difference LD(i) that differs from the optical path length difference of an associated modulator by an amount no greater than the coherence length of the source.

6 Claims, 2 Drawing Sheets

MULTIPLEXED OPTICAL COMMUNICATION SYSTEM

FIELD OF THE INVENTION

The present invention relates to optical communication systems and, in particular, to an improved multiplexing technique for an optical communication system.

BACKGROUND OF THE INVENTION

In recent years, fiber-optic cables have been increasingly used for communications, particularly in telephone systems. Reasons for this increased usage include the facts that optical fibers are lighter in weight and less expensive than electrical conductors, and are not subject to electrical interference. Typically, a communication system includes a light source such as a laser diode or LED, and a photodetector such as a silicon photodiode, connected through a single mode or multimode fiber optic cable. The source should ideally operate with a stable, single frequency output. Information is transmitted in digital form, as a series of light pulses that form a bit stream.

In order to increase the information-carrying capacity of a fiber-optic cable, frequency and time division multiplexing techniques have been widely explored in recent years. Examples of prior art frequency division multiplexing optical communication systems are described in U.S. Pat. Nos. 4,236,243 and 4,592,043. However, a number of problems have been encountered in implementing such systems. These problems include frequency variations of the semiconductor light sources, matching of the multiplexer and demultiplexer coupling frequencies, and the need for relatively large channel spacing to accommodate aging effects and manufacturing tolerances of semiconductor lasers.

SUMMARY OF THE INVENTION

The present invention provides an optical communication system having a new multiplexing technique for permitting a common optical bus to carry a plurality of signals. The communication system of the present invention avoids many of the problems associated with wavelength and time division multiplexing techniques.

In a preferred embodiment, the optical communication system of the present invention comprises a common optical bus, one or more optical sources, a multiplexer and a demultiplexer. The multiplexer comprises a plurality of modulators, each modulator being formed in an electro-optic substrate and comprising a modulated arm and a reference arm. Each arm comprises an optical waveguide having first and second ends. The arms of modulator (i) have an optical path length difference $LM(i)$ that is greater than the coherence length of the associated optical source, and that differs from the path length difference $LM(j)$ of each other modulator by an amount greater than the coherence length of the source associated with the said other modulator. Each modulator further comprises means for varying the optical path length of its modulated arm based on an electrical input signal representing an input data channel.

The demultiplexer comprises a plurality of detectors coupled to receive radiation from the optical bus. Each detector is formed in any suitable substrate, and comprises first and second detector arms. Each detector arm comprises an optical waveguide having first and second ends. The detector arms have an optical path length difference $LD(i)$ that differs from the optical path length difference $LM(i)$ of an associated modulator by an amount not substantially greater than the coherence length of the source associated with path length difference $LM(i)$. The detector further comprises means for coupling radiation from the optical bus into the first ends of the detector arms, and means for combining radiation from the second ends of the detector arm to produce an optical output signal corresponding to the input data channel of the associated modulator.

DETAILED DESCRIPTION OF THE INVENTION

Figure 1:
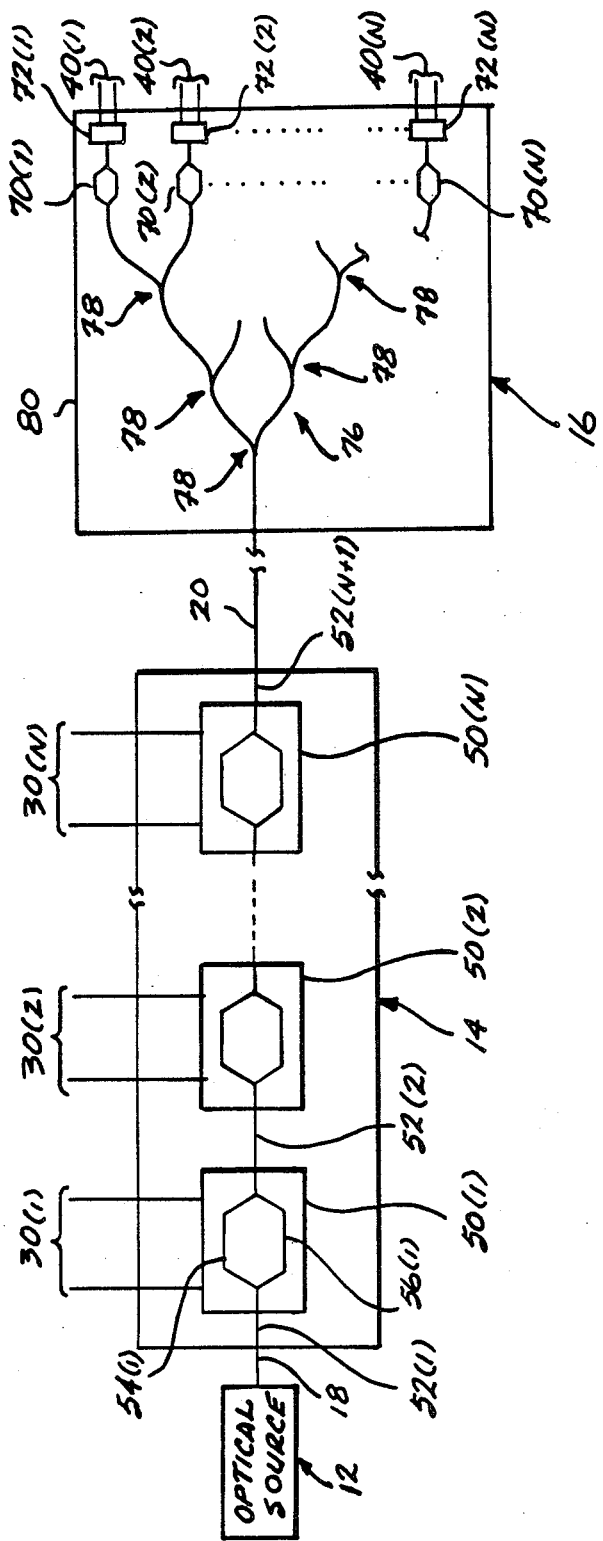
FIG. 1 is a schematic diagram showing a preferred embodiment of the multiplexed optical communication system of the present invention.

FIG. 1 sets forth a preferred embodiment of an optical communication system utilizing the phase modulation multiplexing technique of the present invention. The optical communication system includes optical source 12, multiplexer 14, demultiplexer 16, and an optical bus comprising single mode fiber optic cables 18 and 20. Source 12 provides an optical input or carrier signal to multiplexer 14 via fiber-optic cable 18. Multiplexer 14 receives a plurality (N) of electrical input signals on input data channels 30(1) through 30(N), each data channel comprising a conductor pair that carries a time varying electrical signal representing a serial data stream. Multiplexer 14 phase modulates the optical carrier signal in accordance with the data on input data channels 30, and produces a modulated optical signal on fiber-optic cable 20. The modulated optical signal is received by demultiplexer 16, and the demultiplexer separates the signals from the N input data channels, by a technique described below, and produces electrical output signals on output data channels 40(1) through 40(N). Each electrical output signal corresponds to the electrical input signal on a corresponding one of the input data channels.

Multiplexer 14 comprises N electro-optic modulators 50(1) through 50(N) serially connected along single mode waveguides or optical fibers 52(1) through 52(N+1) that are connected between fiber-optic cables 18 and 20, to thereby form a single, common optical bus along which all modulators are serially connected. Each modulator 50(i) comprises a Mach-Zehnder interferometer that includes a modulated arm 54(i) and a reference arm 56(i), both arms comprising single mode optical waveguides formed in a suitable electro-optic substrate such as lithium niobate or gallium arsenide. The modulated and reference arms of each modulator are coupled to waveguides 52 by Y couplers, such that the carrier signal produced by optical source 12 travels through both arms of each modulator. Thus, for example, radiation from source 12 enters modulator 50(1) via fiber optic cables 18 and waveguide 52(1), and is evenly split between modulated arm 54(1) and reference arm 56(1). The radiation that passes through these two arms is then combined onto waveguide 52(2), and continues to the next modulator 50(2).

Each modulator 50(i) is connected to the conductor pair that forms a respective one of the data channel 30(i). As the signal on the data channel varies, the effective optical path through modulated arm 54(i) also varies, thereby phase modulating that portion of the carrier that passes through the modulated arm. An example of a modulator of this general type is shown in U.S. Pat. No. 4,340,272.

Demultiplexer 16 comprises N detectors 70(1)–70(N) and a corresponding series N of photodetectors 72(1) through 72(N). Each detector comprises a Mach-Zehnder interferometer. Demultiplexer 16 further comprises a branching structure of waveguides 76 through which each detector is coupled to fiber optic cable 20 through a series of Y power splitters or couplers 78. The entire demultiplexer 16 comprising detectors 70, photodetectors 72 and waveguide structure 76 is preferably fabricated on a single substrate 80. Substrate 80 may comprise silicon, glass, or an electro-optic material such as lithium niobate or gallium arsenide. Each detector produces an optical output signal that is converted to a corresponding electrical output signal by the associated photodetector, the photodetector output comprising the electric output signal for one of data channels 48.

Figure 2:
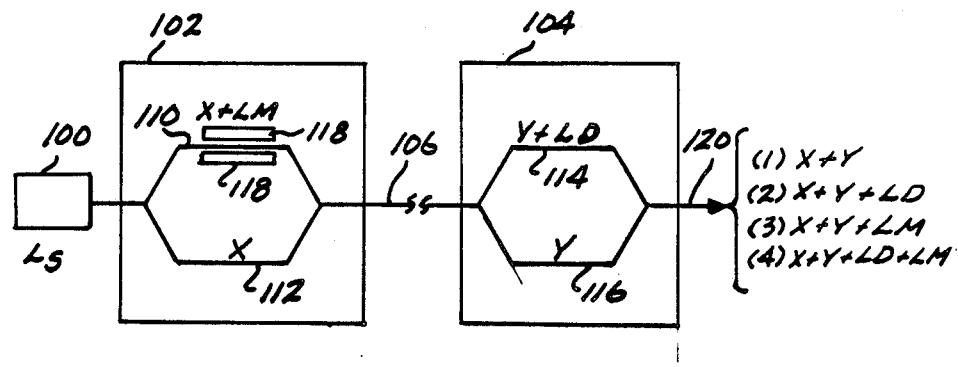
FIG. 2 is a schematic diagram illustrating the phase modulation technique utilized in the present invention.

The multiplexing technique of the present invention is based upon the phase modulation of the optical carrier by multiplexer 14, and the subsequent detection of that phase modulation by demultiplexer 16. The phase modulation technique can be described with reference to the simplified system shown in FIG. 2, comprising optical source 100, modulator 102, detector 104, and single mode fiber optic cable 106. Modulator 102 comprises a Mach-Zehnder interferometer that includes modulated arm 110 and reference arm 112, and detector 104 comprises a Mach-Zehnder interferometer that includes first arm 114 and second arm 116. Modulator 102 is fabricated in an electro-optic substrate, and electrodes 118 are positioned adjacent to modulated arm 110 and connected to receive an electrical input signal. Modulator 102 is constructed such that in the absence of an electrical input signal, there exists an optical path length difference LM between modulated arm 110 and reference arm 112. Thus the lengths of the modulated and reference arms can be designated X+LM and X, respectively. Detector 104 is constructed such that arms 114 and 116 have a path length difference of LD, and the optical path lengths of the first and second arms can therefore be designated Y+LD and Y.

As a result of the described arrangement, the optical signal produced on output fiber optic cable or waveguide 120 includes radiation that has traveled four different path lengths. Ignoring the common path lengths in the interconnecting cables or waveguides, these path lengths are:

$$X+Y \quad (1)$$

$$X+Y+LD \quad (2)$$

$$X+Y+LM \quad (3)$$

$$X+Y+LM+LD \quad (4)$$

In accordance with the phase modulation technique of the present invention, path length differences LD and LM are made to be approximately equal to one another and, in particular, the difference between path length differences LD and LM is made less than the coherence length $L_s$ of optical source 100. Under these conditions, radiation that has traveled the optical path of length X+Y+LD will interfere with radiation that has traveled the optical path of length X+Y+LM. When such interference is produced, modulation of the value LM by variation of the electrical input signal on the input data channel will produce intensity modulation of the optical signal on waveguide 120. This optical signal is converted into an electrical signal by a photodetector, and the photodetector output thereby reproduces the electrical input signal to modulator 102.

Referring again to FIG. 1, it will be assumed that each modulator 50(i) has a path length difference LM(i) between its modulated and reference arms, and that each detector 70(i) has a path length difference LD(i) between its first and second arms. The modulation technique described in connection with FIG. 2 can then be applied to the N channel system of FIG. 1 by imposing the following constraints: each path length difference LM(i) must be greater than the coherence length of optical source 12; each path length difference LM(i) must differ from the path length difference LM(j) of each other modulator, and from any linear combinations of the path length differences of other modulators, by an amount greater than the coherence length of optical source 12; and a detector (i) is associated with each modulator (i) such that the difference between LM(i) and LD(i) is not substantially greater than the coherence length of optical source 12. Under these conditions, modulation of the optical path length of the modulated arm 54(i) of modulator (i) will produce an amplitude variation in the optical output signal of its associated detector 70(i), but will not cause any variation in the optical output signals of any other detector. Conversion of the electrical output signals from the detectors 70(i) by photodetectors 72(i) will thereby reproduce the electrical signals on input data channels 30 on output data channels 40.

Utilization of the above-described techniques in a practical device requires an optical source with an appropriate coherence length, and modulators and detectors with appropriate path length differences. In a preferred embodiment, optical source 12 is a superluminescent diode (SLD) or an edge light emitting diode (ELED). Typically, these sources have coherence lengths on the order of 20 microns. For such an embodiment, the modulators could be fabricated with path length differences of 100 microns, 200 microns, etc. to satisfy the above-described conditions. Such path length differences can be achieved by waveguide interferometers using known integrated optic fabrication techniques. In a preferred embodiment, all modulator interferometers 50 are fabricated on a single electro-optic substrate, and the entire demodulator 16, including demodulators 70, photodetectors 72 and waveguide structure 76 are also fabricated on a single silicon, glass or electro-optic substrate.

The multiplexing technique of the present invention provides a number of significant advantages as compared to wavelength and time division multiplexing approaches. One advantage is that careful control of the source wavelength is not required, as is the case for wavelength division multiplexing. Source wavelength control is a significant challenge in wavelength division multiplexing, because it is typically temperature dependent. A second advantage of the present invention is that high speed synchronization of the multiplexed channels is not required, as is the case for time division multiplexing.

Figure 3:
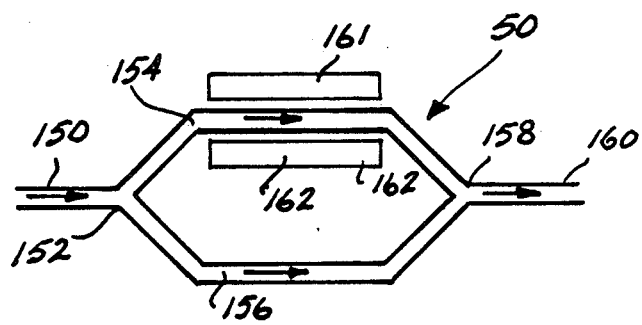
FIG. 3 is a schematic diagram showing one modulator.

Electro-optic modulators of the type suitable for use as modulators 50 in FIG. 1 are known in this art, and a typical modulator is shown in schematic form in FIG. 3. Modulator 50 comprises input waveguide 150, power divider or 1:2 coupler 152, modulated arm (waveguide) 154, reference arm (waveguide) 156, 2:1 coupler 158, output waveguide 160, and electrodes 161 and 162. The waveguides and couplers are formed in an electro-optic substrate, such as lithium niobate or gallium arsenide. Coupler 152 preferably evenly divides the optical radiation on waveguide 150 between arms 154 and 156, and radiation that has traveled through the arms is combined by coupler 158 onto output waveguide 160.

Electrodes 161 and 162 are metal layers formed on the surface of the electro-optical material, and are coupled to the input data channel. Waveguides 154 and 156 are formed such that there is a precisely controlled path length difference between the arms. Application of a differential voltage signal on electrodes 161 and 162 results in an electric field that passes through that portion of arm 154 between the electrodes. This electric field modifies the index of refraction of the waveguide, to thereby phase modulate the radiation passing through the modulator arm. Preferably, the modulator is constructed such that the maximum electric signal applied to the electrodes produces a phase change in the modulated arm that does not exceed $\pm \pi/2$.

In general, each detector 70 may comprise a Mach-Zehnder interferometer fabricated on a suitable substrate. In certain embodiments, it may be desirable to include means for adjusting the optical path length of one of the detector arms. In such a case, the detector would be fabricated on an electro-optic substrate, and would include trim electrodes positioned adjacent one of the detector arms. The trim voltage could be applied by manual means, or preferably by means of a suitable feedback circuit of a type known in this art, to cause the detector to operate at a quadrature point to provide maximum sensitivity.

While the preferred embodiments of the invention have been illustrated and described, variations will be apparent to those skilled in the art. For example, all modulators may be connected in parallel to fiber optic cable 20, with all modulators connected to a single optical source, or with a separate optical source for each modulator. Accordingly, the invention is not to be limited to the described embodiments, and the true scope of the invention is to be determined by reference to the following claims.

The embodiments of the invention in which an exclusive property or privilege is claimed are defined as follows:

1. An optical communication system, comprising:
   a common optical bus;
   one or more optical sources, each source having a coherence length;
   a multiplexer comprising a plurality of modulators, each modulator being formed in an electro-optic substrate and comprising a modulated arm and a reference arm, each arm comprising an optical waveguide having first and second ends, the modulator further comprising means for coupling radiation from an associated one of the sources into the first ends of the arms and means for coupling radiation from the second ends of the arms into the optical bus, the arms of each modulator (i) having an optical path length difference LM(i) that is greater than the coherence length of the associated source and that differs from the path length difference LM(i) of each other modulator by an amount greater than the coherence length of the source associated with said other modulator, each modulator (i) further comprising means for varying the optical path length of the modulated arm based on an electrical input signal (i) representing an input data channel (i); and
   a demultiplexer comprising a plurality of detectors coupled to receive radiation from the optical bus, each detector comprising first and second detector arms, each detector arm comprising an optical waveguide having first and second ends, the detector arms having an optical path length difference LD(i) that differs from the optical path length difference LM(i) of an associated modulator by an amount not substantially greater than the coherence length of the source associated with path length difference LM(i), the detector further comprising means for coupling radiation from the optical bus into the first ends of the detector arms and means for combining radiation from the second ends of the detector arms to produce an optical output signal (i) corresponding to electrical input signal (i).

2. The communication system of claim 1, wherein the demultiplexer further comprises a photodetector associated with each detector (i) for converting the optical output signal (i) into an electrical output signal (i) corresponding to electrical input signal (i).

3. The communication system of claim 2, wherein all detectors and all photodetectors are formed on a single substrate.

4. The communication system of claim 1, wherein a common optical source is provided, and wherein the modulators are serially coupled along the optical bus, such that radiation from the common optical source passes from the first to the second end of each arm of each modulator.

5. The communication system of claim 4, wherein all modulators are formed on a common electro-optic substrate.

6. The communication system of claim 1, wherein the optical source comprises a superluminescent diode or an edge light emitting diode.

* * * * *